US008085353B2

(12) United States Patent
Shin et al.

(10) Patent No.: US 8,085,353 B2
(45) Date of Patent: Dec. 27, 2011

(54) THIN FILM TRANSISTOR ARRAY PANEL HAVING A PIXEL ELECTRODE INCLUDING A FIRST SUBPIXEL ELECTRODE AND A SECOND SUBPIXEL ELECTRODE CONNECTED TO THE DRAIN ELECTRODE OF THE THIN FILM TRANSISTOR AND A THIRD SUBPIXEL ELECTRODE CAPACITIVELY COUPLED TO A COUPLING ELECTRODE EXTENDED FROM THE DRAIN ELECTRODE

(75) Inventors: Kyoung-Ju Shin, Yongin-si (KR); Cheol-Woo Park, Suwon-si (KR); Jae-Jin Lyu, Gyeonggi-do (KR); Chong-Chul Chai, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/262,894

(22) Filed: Oct. 31, 2005

(65) Prior Publication Data
US 2006/0092367 A1 May 4, 2006

(30) Foreign Application Priority Data
Nov. 4, 2004 (KR) .................. 10-2004-0089246

(51) Int. Cl.
*G02F 1/136* (2006.01)
*G02F 1/1343* (2006.01)
(52) U.S. Cl. ........... 349/42; 349/139; 349/142; 349/144
(58) Field of Classification Search .................. 349/42, 349/129, 139–144
See application file for complete search history.

(56) References Cited

U.S. PATENT DOCUMENTS

| 5,576,858 | A | * | 11/1996 | Ukai et al. ...................... 349/42 |
| 5,576,863 | A | * | 11/1996 | Aoki et al. ..................... 349/124 |
| 5,680,190 | A | * | 10/1997 | Michibayashi et al. ...... 349/140 |
| 5,734,449 | A | * | 3/1998 | Jang ................................ 349/39 |
| 5,994,721 | A | * | 11/1999 | Zhong et al. .................... 257/89 |
| 6,600,539 | B2 | * | 7/2003 | Song ............................. 349/130 |
| 6,633,360 | B2 | * | 10/2003 | Okada et al. .................. 349/145 |

(Continued)

FOREIGN PATENT DOCUMENTS

CN 1515948 7/2004

(Continued)

*Primary Examiner* — Lauren Nguyen
(74) *Attorney, Agent, or Firm* — F. Chau & Associates, LLC

(57) ABSTRACT

A thin film transistor (TFT) array panel for a Liquid Crystal Display apparatus (LCD) is provided. The TFT array panel comprises a plurality of gate lines, at least one data line intersecting the plurality of gate lines and at least one thin film transistor connected to at least one of the gate lines and the at least one data line. The at least one film transistor comprises a drain electrode. In addition, the TFT array panel further comprises at least one pixel electrode including at least one first subpixel electrode connected to the drain electrode of the thin film transistor and a second subpixel electrode capacitively coupled to the at least one first subpixel electrode. Moreover, the pixel electrode has a partitioning member for partitioning the pixel electrode into at least two partitions having portions which do not overlap the drain electrode. The at least two partitions are disposed symmetrically to a reference line equidistant from the plurality of gate lines.

22 Claims, 8 Drawing Sheets

U.S. PATENT DOCUMENTS

| | | | |
|---|---|---|---|
| 6,710,372 B2* | 3/2004 | Kim | 257/72 |
| 6,724,453 B2* | 4/2004 | Cho | 349/139 |
| 6,784,965 B2* | 8/2004 | Kim et al. | 349/141 |
| 6,833,897 B2* | 12/2004 | Lee et al. | 349/141 |
| 6,922,183 B2 | 7/2005 | Ting et al. | 345/87 |
| 6,954,246 B2 | 10/2005 | Kim et al. | 349/129 |
| 7,206,048 B2* | 4/2007 | Song | 349/129 |
| 2001/0035919 A1* | 11/2001 | Zhang | 349/44 |
| 2002/0109813 A1* | 8/2002 | Yu et al. | 349/141 |
| 2003/0197825 A1 | 10/2003 | Lee et al. | |
| 2004/0070713 A1* | 4/2004 | Song | 349/129 |
| 2004/0160560 A1* | 8/2004 | Kim et al. | 349/129 |
| 2004/0178409 A1* | 9/2004 | Hong et al. | 257/59 |
| 2005/0036091 A1* | 2/2005 | Song | 349/129 |
| 2006/0023137 A1* | 2/2006 | Kamada et al. | 349/44 |

FOREIGN PATENT DOCUMENTS

| | | |
|---|---|---|
| EP | 1 605 511 A2 | 12/2005 |
| JP | 07-098462 | 4/1995 |
| JP | 09-269509 | 10/1997 |
| KR | 1020010106849 | 12/2001 |
| KR | 1020030042221 | 5/2003 |
| WO | WO 2004/029709 | 4/2004 |

* cited by examiner

THIN FILM TRANSISTOR ARRAY PANEL HAVING A PIXEL ELECTRODE INCLUDING A FIRST SUBPIXEL ELECTRODE AND A SECOND SUBPIXEL ELECTRODE CONNECTED TO THE DRAIN ELECTRODE OF THE THIN FILM TRANSISTOR AND A THIRD SUBPIXEL ELECTRODE CAPACITIVELY COUPLED TO A COUPLING ELECTRODE EXTENDED FROM THE DRAIN ELECTRODE

CROSS-REFERENCE TO RELATED APPLICATION

This application claims priority from Korean Patent Application No. 10-2004-0089246, filed Nov. 4, 2004, the disclosure of which is hereby incorporated by reference herein in its entirety.

BACKGROUND OF THE INVENTION (a) Field of the Invention

The present invention relates to a thin film transistor (TFT) array panel.

(b) Description of the Related Art

A liquid crystal display apparatus (hereinafter referred to as an LCD) is one of the most widely used flat panel displays. An LCD typically includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer for adjusting polarization of the incident light.

One popular type of LCD, is the vertical alignment (VA) mode LCD, which aligns LC molecules such that the long axes of the LC molecules are perpendicular to the panels in the absence of an electric field. Much attention has been focused on the VA mode LCD because of its high contrast ratio and wide reference viewing angle.

Wide viewing angle of the VA mode LCD can be achieved via cutouts in the field-generating electrodes and protrusions on the field-generating electrodes. The cutouts and the protrusions affect the tilt directions of the LC molecules, e.g., the tilt directions can be distributed into several directions such that the reference viewing angle is widened. However, lateral visibility may not be improved in comparison to front visibility.

SUMMARY OF THE INVENTION

A thin film transistor (TFT) array panel for a Liquid Crystal Display apparatus (LCD) is provided. The TFT array panel comprises a plurality of gate lines, at least one data line intersecting the plurality of gate lines and at least one thin film transistor connected to at least one of the gate lines and the at least one data line. The at least one film transistor comprises a drain electrode. In addition, the TFT array panel further comprises at least one pixel electrode including at least one first subpixel electrode connected to the drain electrode of the thin film transistor and a second subpixel electrode capacitively coupled to the at least one first subpixel electrode. Moreover, the pixel electrode has a partitioning member for partitioning the pixel electrode into at least two partitions having portions which do not overlap the drain electrode. The at least two partitions are disposed symmetrically to a reference line equidistant from the plurality of gate lines.

The at least one first subpixel electrode may be divided into a third subpixel electrode and a fourth subpixel electrode. The drain electrode may include first and second portions connected to the third and the fourth subpixel electrodes, respectively, and disposed substantially symmetrical to the reference line. The thin film array panel may further include first and second storage electrodes overlapping the first and the second portions of the drain electrode, respectively.

The first and the second storage electrodes may be disposed substantially symmetrical to the reference line.

The third and the fourth subpixel electrodes may be disposed opposite each other with respect to the second subpixel electrode and they may be disposed substantially symmetrical to the reference line.

The drain electrode may include an interconnection connecting the first portion and the second portion and the interconnection may be disposed adjacent to the data line and substantially parallel to the data line.

The drain electrode may further include a coupling electrode overlapping the second subpixel electrode, and the thin film array panel may further include a capacitive electrode connected to the second subpixel electrode and overlapping the coupling electrode. The coupling electrode or the capacitive electrode may be disposed substantially symmetrical to the reference line.

The coupling electrode may have a through-hole and the capacitive electrode and the second subpixel electrode may be connected to each other through the through-hole.

The thin film array panel may further include a shielding electrode separated from the pixel electrode and overlapping the data line or the gate line at least in part.

The pixel electrode and the shielding electrode may include the same layer.

The shielding electrode may extend along the data line or the gate lines and may fully cover the data line.

DETAILED DESCRIPTION OF THE PREFERRED EMBODIMENTS

The exemplary embodiments of the present invention now will be described more fully hereinafter with reference to the accompanying drawings, in which preferred embodiments of the invention are shown. The present invention may, however, be embodied in many different forms and should not be construed as limited to the embodiments set forth herein.

Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

An LCD according to an exemplary embodiment of the present invention will be described in detail with reference to FIGS. 1-5.

Figure 1:
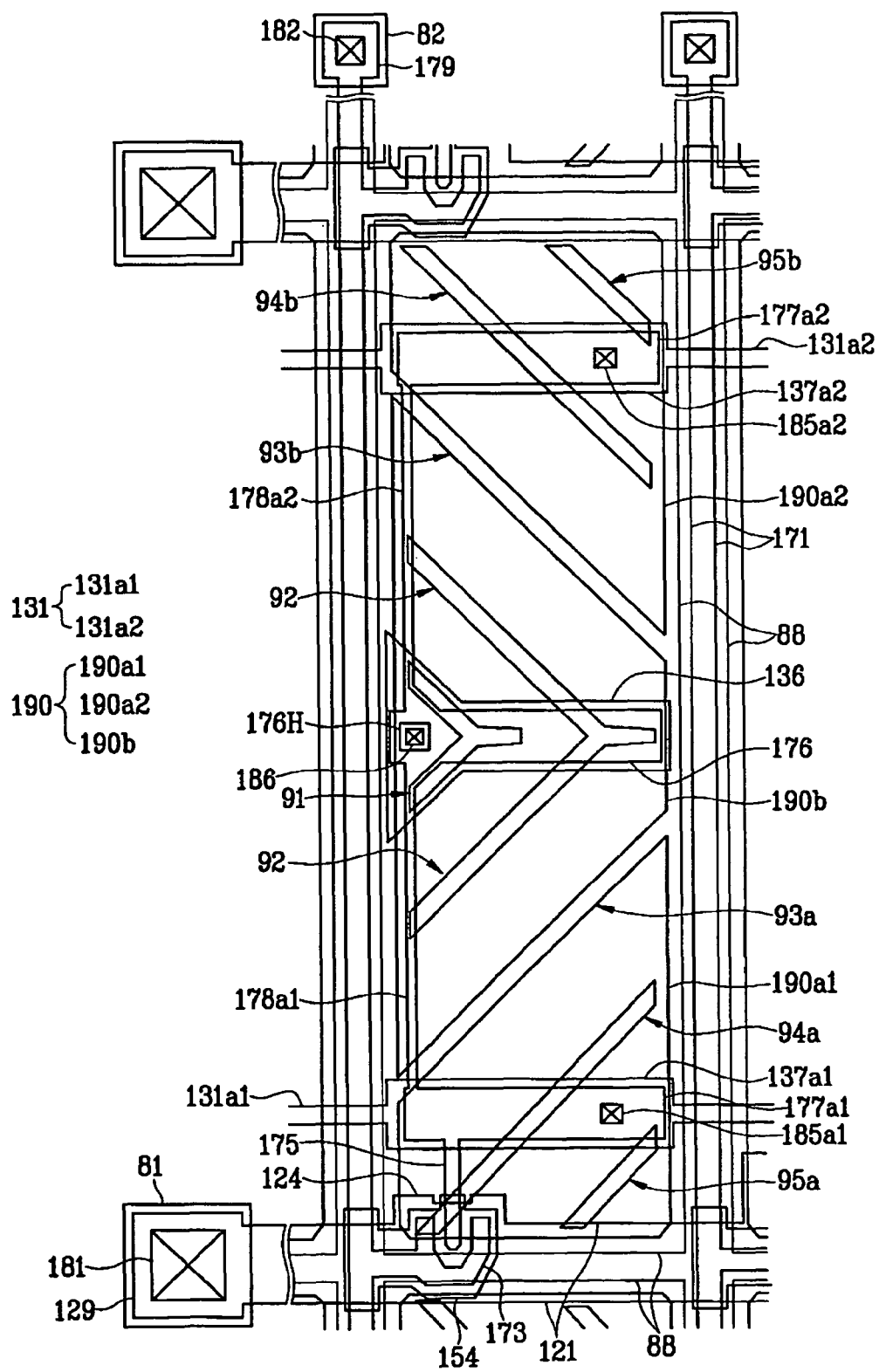
FIG. 1 is a layout view of a TFT array panel of an LCD according to an exemplary embodiment of the present invention.
Figure 2:
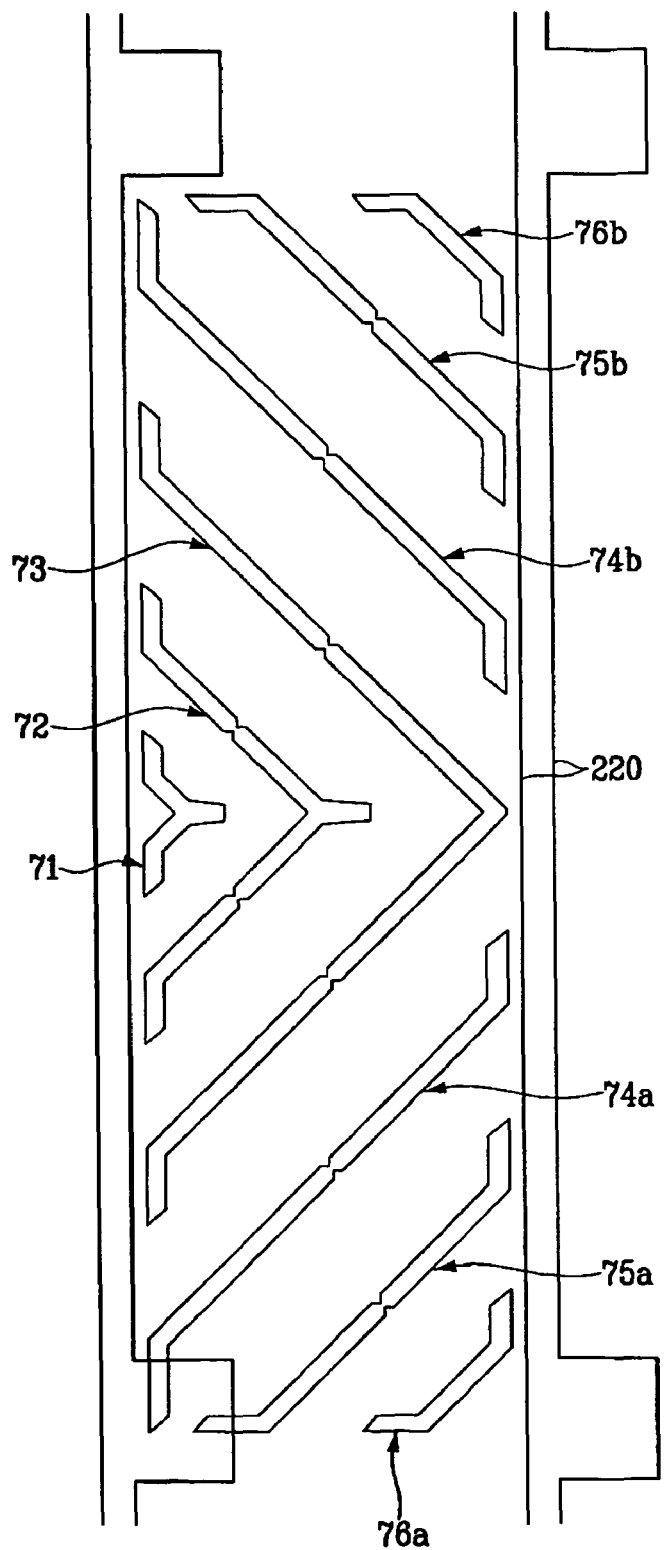
FIG. 2 is a layout view of a common electrode panel of an LCD according to an exemplary embodiment of the present invention.
Figure 3:
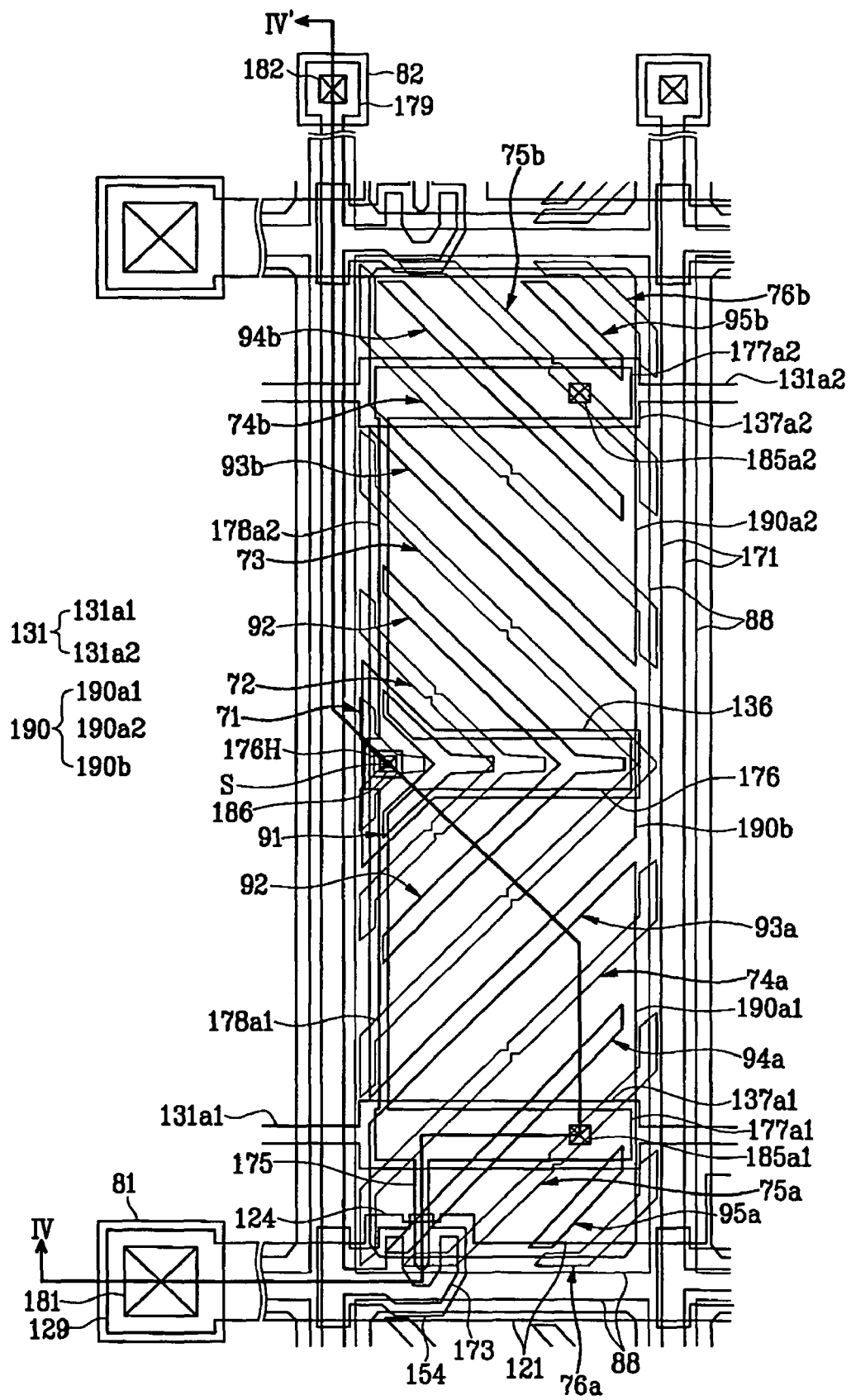
FIG. 3 is a layout view of an LCD including the TFT array panel shown in FIG. 1 and the common electrode panel shown in FIG. 2.
Figure 4:
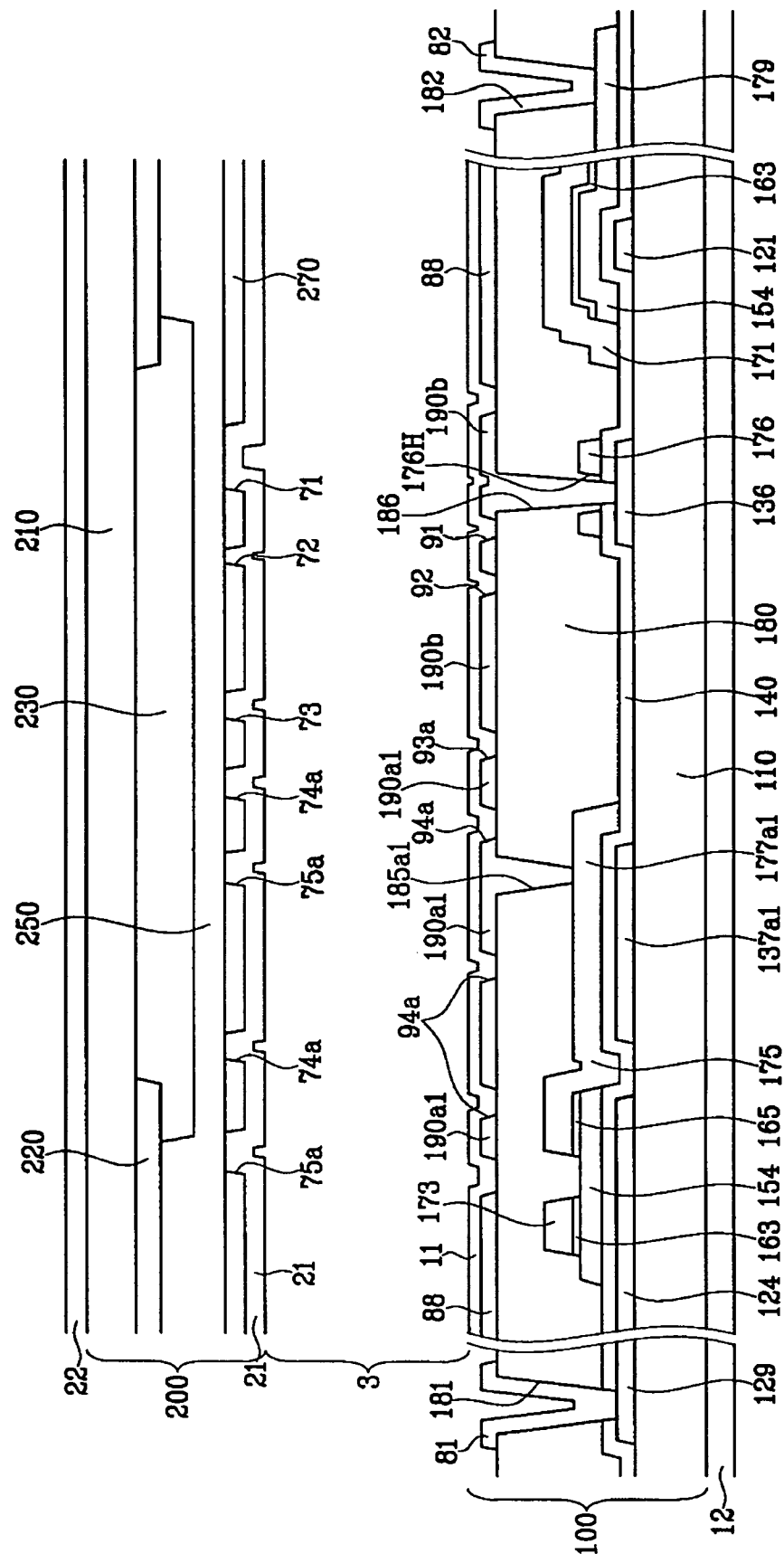
FIG. 4 is a sectional view of the LCD shown in FIG. 3 taken along line IV-IV'.
Figure 5:
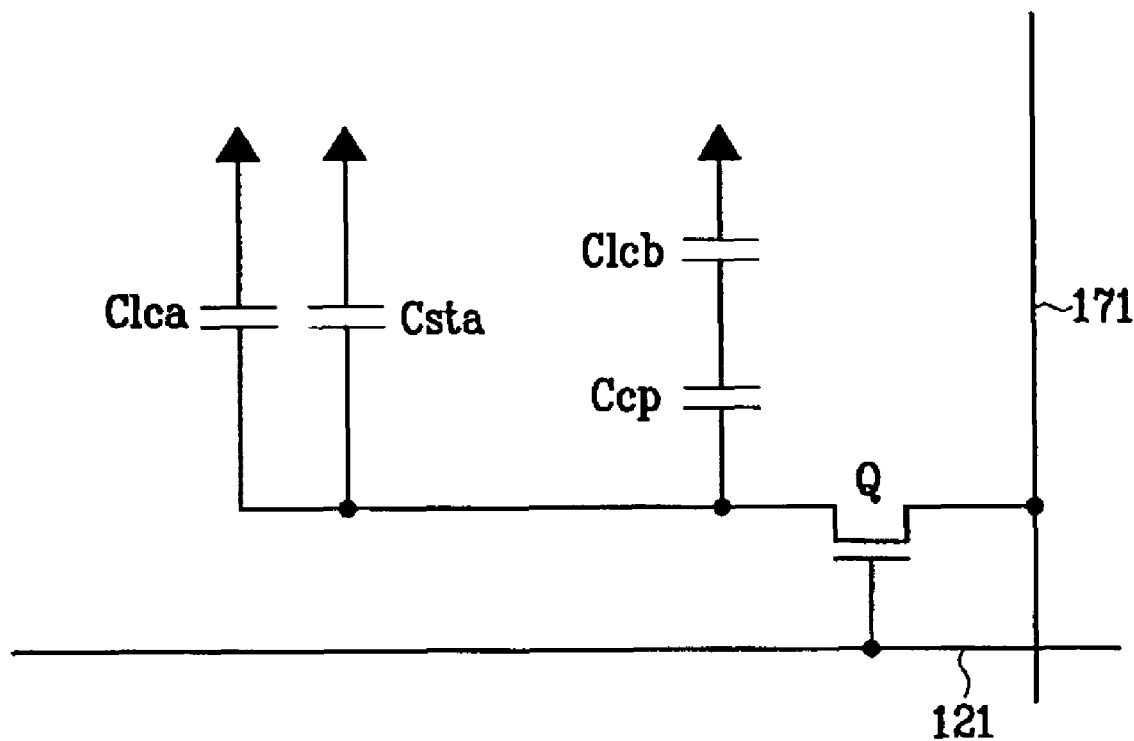
FIG. 5 is an equivalent circuit diagram of the LCD shown in FIGS. 1-4.

FIG. 1 is a layout view of a TFT array panel of the LCD, FIG. 2 is a layout view of a common electrode panel of an LCD, FIG. 3 is a layout view of the LCD including the TFT array panel shown in FIG. 1 and the common electrode panel shown in FIG. 2, FIG. 4 is a sectional view of the LCD shown in FIG. 3 taken along line IV-IV', and FIG. 5 is an equivalent circuit diagram of the LCD shown in FIGS. 1-4.

Referring to FIGS. 1-4, the LCD according to an exemplary embodiment of the present invention includes a TFT array panel 100, a common electrode panel 200, and a LC layer 3 interposed between the panels 100 and 200.

The TFT array panel 100 is now described in detail with reference FIGS. 1, 3 and 4.

The TFT array panel 100 includes a plurality of gate conductors which include a plurality of gate lines 121, a plurality of storage electrode lines 131, and a plurality of capacitive electrodes 136 formed on an insulating substrate 110, such as a transparent glass or plastic substrate.

The gate lines 121 transmit gate signals and extend substantially in a transverse direction. Each gate line 121 includes a plurality of gate electrodes 124 projecting upwardly and an end portion 129 having an area for contact with another layer or external driving circuit. In addition, a gate driving circuit for generating gate signals may be mounted on a flexible printed circuit (FPC) film. The FPC film may either be attached to the substrate 110, directly mounted on the substrate 110, or integrated onto the substrate 110. The gate lines 121 may in turn be connected to the gate driving circuit on the substrate 110.

The storage electrodes 131 are supplied with a predetermined voltage and each of the storage electrodes 131 includes a pair of lower and upper stems 131a1 and 131a2 extend substantially parallel to the gate lines 121. Moreover, each of the storage electrode lines 131 are disposed between the gate lines 121, with the lower and the upper stems 131a1 and 131a2 being disposed in close proximity to the gate lines 121. The lower and the upper stems 131a1 and 131a2 include lower and upper storage electrodes 137a1 and 137a2, respectively, expanding in upward and downward directions, respectively. It is noted however that the storage electrode lines 131 may have various shapes and arrangements.

Further, each of the capacitive electrodes 136 is rectangularly shaped and elongated parallel with respect to the gate lines 121. The capacitive electrodes 136 are separated from the gate lines 121 and the storage electrode lines 131. Moreover, each of the capacitive electrodes 136 is disposed between the pair of lower and upper storage electrodes 137a1 and 137a2 and are also substantially equidistant from the lower and the upper storage electrodes 137a1 and 137a2 and from the gate lines 121. In addition, each of the capacitive electrodes 136 also includes a funneled left end portion that has oblique or inclined edges which make about a 45 degrees angle with respect to the gate lines 121.

The gate conductors 121, 131 and 136 may be made of various metals or conductors. However, the gate conductors 121, 131 and 136 are preferably made of aluminum (Al) or an Al alloy, silver (Ag) or an Ag alloy, copper (Cu) or a Cu alloy, molybdenum (Mo) or a Mo alloy, chromium (Cr), Tantalum (Ta), or Titanium (Ti). In addition, the gate conductors 121, 131 and 136 may each have a multi-layered structure including two conductive films having different physical characteristics. In the above case, one of the two films is preferably made of a low resistivity metal, such as for example an Al containing metal, a Ag containing metal, or a Cu containing metal for reducing signal delay or voltage drop. The other film is preferably made of a material (e.g. a Mo containing metal, Cr, Ta, or Ti) which has good physical, chemical, and electrical contact characteristics with respect to indium tin oxide (ITO) or indium zinc oxide (IZO), such as for example Mo or Mo alloys, Cr, Ta or Ti. Examples of possible combinations for the two films include but are not limited to a lower Cr film and an upper Al (alloy) film and a lower Al (alloy) film and an upper Mo (alloy) film.

The lateral sides of the gate conductors 121, 131 and 136 are inclined relative to a surface of the substrate 110, with an inclination angle from about 30 to about 80 degrees.

Further, a gate insulating layer 140 preferably made of silicon nitride (SiNx) or silicon oxide (SiOx) is formed on the gate conductors 121, 131 and 136.

A plurality of semiconductor islands 154 preferably made of hydrogenated amorphous silicon (abbreviated to "a-Si") or polysilicon are formed on the gate insulating layer 140. The semiconductor islands 154 are disposed on the gate electrodes 124 and include extensions covering edges of the gate lines 121. A plurality of other semiconductor islands (not shown) may be disposed on the storage electrode lines 131.

A plurality of ohmic contact islands 163 and 165 are formed on the semiconductor islands 154. The ohmic contacts 163 and 165 are preferably made of n+ hydrogenated a-Si, which is heavily doped with n type impurity such as phosphorous. Alternatively, the ohmic contacts 163 and 165 may be made of silicide. The ohmic contacts 163 and 165 are located in pairs on the semiconductor islands 154.

The lateral sides of the semiconductor islands 154 and the ohmic contacts 163 and 165 are inclined relative to the surface of the substrate 110, with an inclination angle preferably in a range of about 30 to about 80 degrees.

A plurality of data conductors including a plurality of data lines 171 and a plurality of drain electrodes 175 are formed on the ohmic contacts 163 and 165 and the gate insulating layer 140.

The data lines 171 transmit data signals and extend substantially in a longitudinal direction to intersect the gate lines 121 and the storage electrode lines 131. Each data line 171 includes a plurality of source electrodes 173 projecting toward the gate electrodes 124 and an end portion 179 having an area for contact with another layer or an external driving circuit. A data driving circuit for generating the data signals may be mounted on a FPC film. The FPC film may be attached to the substrate 110, directly mounted on the substrate 110, or integrated onto the substrate 110. The data lines 171 may in turn be connected to the driving circuit on the substrate 110.

Each of the drain electrodes 175 is separated from the data lines 171 and includes an end portion disposed opposite to the source electrodes 173. The end portion is partly enclosed by a source electrode 173 which is curved like the letter U of the alphabet.

Each drain electrode 175 further includes lower, upper, and central expansions 177a1, 177a2, and 176 and a pair of interconnections 178a1 and 178a2 connecting the expansions 177a1, 177a2, and 176. Each of the expansions 177a1, 177a2, and 176 are rectangularly shaped and are elongated parallel with respect to the gate lines 121. Interconnections 178a1 and 178a2 connect the expansions 177a1, 177a2, and 176 near left sides thereof and extend substantially parallel to the data lines 171.

The lower and upper expansions 177a1 and 177a2 overlap lower and upper storage electrodes 137a1 and 137a2, respectively.

The central expansion 176 overlaps a capacitive electrode 136 to form a "coupling electrode." The coupling electrode which includes central expansion 176 and capacitive electrode 136, further includes a through-hole 176H exposing a top surface of the gate insulating layer 140 near a left end portion of the coupling electrode. The through-hole 176H has substantially the same shape as the capacitive electrode 136.

A gate electrode 124, a source electrode 173, and a drain electrode 175 along with a semiconductor island 154 form a TFT having a channel formed in the semiconductor island 154 disposed between the source electrode 173 and the drain electrode 175.

The data conductors 171 and 175 may be made of various metals or conductors. However, the data conductors 171 and 175 are preferably made of refractory metal such as Cr, Mo, Ta, Ti, or alloys thereof. In addition, the data conductors 171 and 175 may each have a multilayered structure including a refractory metal film and a low resistivity film. Examples of the multi-layered structure include but are not limited to a double-layered structure including a lower Cr/Mo (alloy) film and an upper Al (alloy) film or a triple-layered structure of a lower Mo (alloy) film, an intermediate Al (alloy) film, and an upper Mo (alloy) film. However, the data conductors 171 and 175 may be made of various metals or conductors.

The data conductors 171 and 175 have inclined edge profiles, with an inclination angle from about 30 to about 80 degrees.

The ohmic contacts 163 and 165 are interposed between the underlying semiconductor islands 154 and the overlying data conductors 171 and 175 thereon and reduce contact resistance therebetween. Extensions of the semiconductor islands 154 disposed on the edges of the gate lines 121 smooth the profile of the surface of these edges of the gate lines 121 to prevent the disconnection of the data lines 171 there. The semiconductor islands 154 include some exposed portions, which are not covered with the data conductors 171 and 175, such as portions located between the source electrodes 173 and the drain electrodes 175.

A passivation layer 180 is formed on the data conductors 171 and 175, and the exposed portions of the semiconductor islands 154. The passivation layer 180 is preferably made of an inorganic or an organic insulator and may also have a flat surface. Examples of the inorganic insulator include but are not limited to silicon nitride and silicon oxide. The organic insulator may be photosensitive. Moreover, the organic insulator preferably has dielectric constant less than about 4.0. Alternatively, the passivation layer 180 may include a lower film of inorganic insulator and an upper film of organic insulator such that it takes the excellent insulating characteristics of an organic insulator while preventing the exposed portions of the semiconductor islands 154 from being damaged by the organic insulator.

Additionally, the passivation layer 180 has a plurality of contact holes 182 exposing the end portions 179 of the data lines 171 and a plurality of contact holes 185a1 and 185a2 exposing the lower and the upper expansions 177a1 and 177a2 of the drain electrodes 175, respectively. The passivation layer 180 and the gate insulating layer 140 have a plurality of contact holes 181 exposing the end portions 129 of the gate lines 121 and a plurality of contact holes 186 penetrating the through-holes 176H and exposing the end portions of the capacitive electrodes 136. The contact holes 181, 182, 185a1, 185a2 and 186 may have inclined or stepped sidewalls.

A plurality of pixel electrodes 190, a shielding electrode 88, and a plurality of contact assistants 81 and 82 are also formed on the passivation layer 180. They are preferably made of a transparent conductor such as ITO or IZO or reflective conductor such as Ag, Al, Cr, or alloys thereof.

Each pixel electrode 190 is rectangularly shaped or substantially rectangularly shaped and has chamfered corners. The chamfered edges of the pixel electrode 190 make an angle of about 45 degrees with the gate lines 121. The pixel electrodes 190 overlap the gate lines 121 to increase the aperture ratio.

In addition, each of the pixel electrodes 190 has lower and upper gaps 93a and 93b that divide the pixel electrode 190 into lower, upper, and central sub-pixel electrodes 190a1, 190a2 and 190b, respectively. The lower and the upper gaps 93a and 93b obliquely extend from a left edge to a right edge of the pixel electrode 190 such that the central sub-pixel electrode 190b resembles an isosceles trapezoid rotated at a right angle with respect to the gate lines 121 and the lower and the upper sub-pixel electrodes 190a1 and 190a2 resemble right-angled trapezoids rotated at a right angle with respect to the gate lines 121. The lower and the upper gaps 93a and 93b are perpendicular to each other and make an angle of about 45 degrees with respect to the gate lines 121.

The lower and the upper sub-pixel electrodes 190a1 and 190a2 are connected to the lower and the upper expansions 177a1 and 177a2 of the drain electrodes 175 through contact holes 185a1 and 185a2, respectively.

The central sub-pixel electrode 190b is connected to a capacitive electrode 136 through a contact hole 186 and overlaps a coupling electrode 176. The central sub-pixel electrode 190b, the capacitive electrode 136, and the coupling electrode 176 form a "coupling capacitor."

The central sub-pixel electrode 190b has central cutouts 91 and 92, the lower sub-pixel electrode 190a1 has lower cutouts 94a and 95a, and the upper sub-pixel electrode 190a2 has upper cutouts 94b and 95b. The cutouts 91, 92 and 94a-95b partition the sub-pixel electrodes 190b, 190a1 and 190a2 into a plurality of partitions. The pixel electrode 190 having the cutouts 91, 92 and 94a-95b and the gaps 93a and 93b (also referred to as cutouts hereinafter) substantially has an inversion symmetry with respect to a capacitive electrode 136.

Each of the lower and the upper cutouts 94a-95b obliquely or slantingly extends to a right edge of the pixel electrode 190 from a left corner, a lower edge, or an upper edge of the pixel electrode 190. The lower and the upper cutouts 94a-95b extend substantially perpendicular to each other and make an angle of about 45 degrees with respect to the gate lines 121.

Each of the center cutouts 91 and 92 includes a transverse portion and a pair of oblique portions connected thereto. The transverse portion extends along the capacitive electrode 136, and the oblique portions obliquely or slantingly extends from the transverse portion toward the left edge of the pixel electrode 190 parallel to the lower and the upper cutouts 94a-95b, respectively. The center cutout 91 overlaps the funneled end portion of the coupling electrode 176 and the capacitive electrode 136.

The number of cutouts or the number of partitions may be varied depending on the design factors such as the size of the pixel electrode 190, the ratio of the transverse edges and the longitudinal edges of the pixel electrode 190, the type and characteristics of the liquid crystal layer 3, etc.

The shielding electrode 88 is supplied with common voltage and it includes longitudinal portions extending along the data lines 171 and transverse portions extending along the gate lines 121 to connect adjacent longitudinal portions. The longitudinal portions fully or substantially cover the data lines 171 entirely, while each of the transverse portions lies within the boundary of the gate line 121.

The shielding electrode 88 blocks electromagnetic interference between the data lines 171 and the pixel electrodes 190 and between the data lines 171 and the common electrode 270 to reduce the distortion of the voltage of the pixel electrodes 190 and the signal delay of the data voltages carried by the data lines 171.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

The description of the common electrode panel 200 follows with reference to FIGS. 2-4.

A light blocking member 220, also referred to as a black matrix herein, for preventing light leakage is formed on an insulating substrate 210, such as for example a transparent glass or plastic substrate. The light blocking member 220 includes a plurality of rectilinear portions facing the data lines 171 on the TFT array panel 100 and a plurality of widened portions facing the TFTs on the TFT array panel 100. Also, the light blocking member 220 may have a plurality of through-holes that face the pixel electrodes 190. In addition, the light blocking member 220 may have substantially the same shape (e.g. planar shape) as the pixel electrodes 190.

A plurality of color filters 230 are also formed on the substrate 210 and they are disposed substantially in the areas enclosed by the light blocking member 220. The color filters 230 may extend in a longitudinal direction substantially along the pixel electrodes 190. The color filters 230 may each represent one of the primary colors such as red, green and blue colors.

An overcoat 250 is formed on the color filters 230 and the light blocking member 220. The overcoat 250 is preferably made of an (organic) insulator and it prevents the color filters 230 from being exposed and also provides a flat surface.

A common electrode 270 is formed on the overcoat 250. The common electrode 270 is preferably made of transparent conductive material such as ITO and IZO and has a plurality cutout sets 71, 72, 73, 74a, 74b, 75a, 75b, 76a and 76b.

Cutout sets 71-76b face a pixel electrode 190 and include center cutouts 71, 72 and 73, lower cutout 74a, 75a and 76a and upper cutouts 74b, 75b and 76b. Cutout 71 is disposed near the contact hole 186, while each of the other cutouts 72-76b of the set are disposed between adjacent cutouts 91-95b of the pixel electrode 190. Alternatively, each of the cutouts 72-76b may be disposed between a cutout 95a or 95b and a chamfered edge of the pixel electrode 190. In addition, each of the cutouts 71-76b has at least an oblique portion extending parallel to the lower cutout 93a-95a or the upper cutout 93b-95b of the pixel electrode 190. Moreover, each of the oblique portions of the cutouts 72-75b has a depressed notch and the cutouts 71-76b have substantially an inversion symmetry with respect to a capacitive electrode 136.

Each of the lower and the upper cutouts 74a-76b includes an oblique portion and a pair of transverse and a pair of longitudinal portions. The oblique portion extends to a right edge of the pixel electrode 190 from either a left edge, a lower edge, or an upper edge of the pixel electrode 190. The transverse and longitudinal portions extend from respective ends of the oblique portion along edges of the pixel electrode 190, overlapping the edges of the pixel electrode 190, and making obtuse angles with respect to the oblique portion.

Each of the center cutouts 71 and 72 includes a central transverse portion, a pair of oblique portions, and a pair of terminal longitudinal portions. The center cutout 73 includes a pair of oblique portions and a pair of terminal longitudinal portions. The central transverse portion is disposed near the left edge or the center of the pixel electrode 190 and extends along the capacitive electrode 136. The oblique portions of the center cutout 73 extend from an end of the central transverse portion or from the center of the right edge of the pixel electrode 190, located to the left edge of the pixel electrode. The oblique portions of the cutouts 71 and 72 make oblique angles with respect to the central transverse portion. The terminal longitudinal portions extend from the ends of the respective oblique portions along the left edge of the pixel electrode 190, overlapping the left edge of the pixel electrode 190, and make obtuse angles with respect to the respective oblique portions.

The number of cutouts 71-76b may be also varied depending on the design factors. The light blocking member 220 preferably overlaps the cutouts 71-76b to block the light leakage through the cutouts 71-76b.

Alignment layers 11 and 21 may be homeotropic and are coated on inner surfaces of the panels 100 and 200. Polarizers 12 and 22 are provided on outer surfaces of the panels 100 and 200 so that their polarization axes may be crossed and one of the polarization axes may be parallel to the gate lines 121. One of the polarizers 12 and 22 may be omitted when the LCD is a reflective LCD.

The LCD may further include at least one retardation film for compensating the retardation of the LC layer 3. The retardation film has birefringence and gives a retardation opposite to that given by the LC layer 3.

The LCD may further include a backlight unit supplying light to the LC layer 3 through the polarizers 12 and 22, the retardation film, and the panels 100 and 200.

It is preferable that the LC layer 3 is in a state of negative dielectric anisotropy. In addition, it is also preferable that the LC layer 3 have been subjected to a vertical alignment in that the LC molecules in the LC layer 3 are aligned such that their long axes are substantially vertical to the surfaces of the panels 100 and 200 in the absence of an electric field. Accordingly, incident light cannot pass the crossed polarization system 12 and 22.

Opaque members such as the storage electrode lines 131, the expansions 177a1, 177a2 and 176, the interconnections 178a1 and 178a2 of the drain electrodes 175, and the transparent members such as the pixel electrodes 190 having the cutouts 91-95b and 71-76b are symmetrically arranged with respect to the capacitive electrodes 136. Also, since the interconnections 178a1 and 178a2 are disposed near the edges of the pixel electrodes 190, they do not decrease the light transmissive areas, but rather block the texture generated near the light transmissive areas.

The LCD according to an exemplary embodiment of the present invention and shown in FIGS. 1-4 is represented as an equivalent circuit shown in FIG. 5.

Referring to FIG. 5, a pixel of the LCD includes a TFT Q, a first subpixel including a first LC capacitor ($C_{LC}a$) and a storage capacitor ($C_{ST}$), a second subpixel including a second LC capacitor ($C_{LC}b$), and a coupling capacitor (Ccp).

The first LC capacitor $C_{LC}a$ includes lower and upper sub-pixel electrodes 190a1 and 190a2 as one terminal, a portion of the common electrode 270 corresponding thereto as the other terminal, and a portion of the LC layer 3 disposed therebetween as a dielectric. Similarly, the second LC capacitor $C_{LC}b$ includes a central sub-pixel electrode 190*b* as one terminal, a portion of the common electrode 270 corresponding thereto as the other terminal, and a portion of the LC layer 3 disposed thereon as a dielectric.

The storage capacitor $C_{ST}$ includes lower and upper expansions 177*a*1 and 177*a*2 of a drain electrode 175 as one terminal, lower and upper storage electrodes 137*a*1 and 137*a*2 as the other terminal, and a portion of the gate insulating layer 140 disposed therebetween as a dielectric. The coupling capacitor Ccp includes a central sub-pixel electrode 190*b* and a capacitive electrode 136 as one terminal, a coupling electrode 176 as the other terminal, and portions of the passivation layer 180 and the gate insulating layer 140 disposed therebetween as a dielectric.

The first LC capacitor $C_{LC}a$ and the storage capacitor $C_{ST}$ are connected in parallel to a drain of the TFT Q. The coupling capacitor Ccp is connected between the drain of the TFT Q and the second LC capacitor $C_{LC}b$. The common electrode 270 is supplied with a common voltage Vcom and the storage electrode lines 131 may be supplied with the common voltage Vcom.

The TFT Q applies data voltages from data line 171 to the first LC capacitor $C_{LC}a$ and the coupling capacitor Ccp in response to a gate signal from gate line 121. The coupling capacitor Ccp transmits the data voltage with a modified magnitude to the second LC capacitor $C_{LC}b$.

When the storage electrode line 131 is supplied with the common voltage Vcom, the voltage Vb charged across the second LC capacitor $C_{LC}b$ is given by:

$$Vb = Va \times [Ccp/(Ccp+C_{LC}b)],$$

where Va denotes the voltage of the first LC capacitor $C_{LC}a$.

Since the term $Ccp/(Ccp+C_{LC}b)$ is smaller than one, the voltage Vb of the second LC capacitor $C_{LC}b$ is less greater than that of the first LC capacitor $C_{LC}a$. The above inequality may also occur in the situation wherein the voltage of the storage electrode line 131 does not equal the common voltage Vcom.

When the potential difference is generated across the first LC capacitor $C_{LC}a$ or the second LC capacitor $C_{LC}b$, an electric field substantially perpendicular to the surfaces of the panels 100 and 200 is generated in the LC layer 3. Both the pixel electrode 190 and the common electrode 270 are commonly referred to as field generating electrodes hereinafter. Then, the LC molecules in the LC layer 3 tilt in response to the electric field such that their long axes are perpendicular to the field direction. The degree of the tilt of the LC molecules determines the variation of the polarization of light incident on the LC layer 3. In turn, the variation of the light polarization is transformed into the variation of the light transmittance by the polarizers 12 and 22. In this way, the LCD displays images.

The tilt angle of the LC molecules depends on the strength of the electric field. Since the voltage Va of the first LC capacitor $C_{LC}a$ and the voltage Va of the second LC capacitor $C_{LC}b$ are different from each other, the tilt direction of the LC molecules in the first subpixel is different from that in the second subpixel and thus the luminances of the two subpixels are different. Thus, by maintaining the average luminance of the two subpixels in a target luminance, the voltages Va and Vb of the first and the second subpixels can be adjusted so that an image viewed from a lateral side is closer to an image viewed from the front, thereby improving the lateral visibility.

The ratio of the voltages Va and Vb can be adjusted by varying the capacitance of the coupling capacitor Ccp. Moreover, the coupling capacitance Ccp can be varied by changing the overlapping area and distance between the coupling electrode 176 and the central sub-pixel electrode 190*b* (and the capacitive electrode 136). For example, the distance between the coupling electrode 176 and the central sub-pixel electrode 190*b* becomes large when the capacitive electrode 136 is removed and the coupling electrode 176 is moved to the position of the capacitive electrode 136. Preferably, the voltage Vb of the second LC capacitor $C_{LC}b$ is from about 0.6 to about 0.8 times the voltage Va of the first LC capacitor $C_{LC}a$.

The voltage Vb charged in the second LC capacitor $C_{LC}b$ may be larger than the voltage Va of the first LC capacitor $C_{LC}a$. This is achieved by precharging the second LC capacitor $C_{LC}b$ with a predetermined voltage such as the common voltage Vcom.

The ratio between the lower and the upper sub-pixel electrodes 190*a*1 and 190*a*2 of the first subpixel and the central sub-pixel electrode 190*b* of the second subpixel is preferably from about 1:0.85 to about 1:1.15. In addition, the number of the sub-pixel electrodes in each of the LC capacitors $C_{LC}a$ and $C_{LC}b$ may be changed.

The tilt direction of the LC molecules is determined by a horizontal component generated by the cutouts 91-95*b* and 71-76*b* of the field generating electrodes 190 and 270 and the oblique edges of the pixel electrodes 190 distorting the electric field. The electric field being perpendicular or at least substantially perpendicular to the edges of cutouts 91-95*b* and 71-76*b* and the oblique edges of the pixel electrodes 190. Referring to FIG. 3, a set of the cutouts 91-95*b* and 71-76*b* divides a pixel electrode 190 into a plurality of sub-areas and each sub-area has two major edges. Since the LC molecules on each sub-area tilt perpendicular to the major edges, the azimuthal distribution of the tilt directions are localized to four directions, thereby increasing the reference viewing angle of the LCD.

In addition, when the areas that can transmit light for the above-described four tilt directions are the same, the visibility improves for various viewing directions. Since the opaque members are symmetrically arranged as described above, the adjustment of the transmissive areas is relatively simple.

The notches in the cutouts 72-75*b* help determine the tilt directions of the LC molecules on the cutouts 72-75*b*. Notches may also be provided in cutouts 91-95*b* and may have various shapes and arrangements.

The shapes and the arrangements of the cutouts 91-95*b* and 71-76*b* for determining the tilt directions of the LC molecules may be modified and at least one of the cutouts 91-95*b* and 71-76*b* can be substituted with protrusions or depressions. The protrusions are preferably made of organic or inorganic material and disposed on or under the field-generating electrodes 190 or 270.

Further, since there is no electric field between the shielding electrode 88 and the common electrode 270, the LC molecules on the shielding electrode 88 remain in their initial orientations and thus the light incident thereon is blocked. In the above situation, the shielding electrode 88 may serve as a light blocking member and the light blocking member 220 may thus be omitted.

An LCD according to an exemplary embodiment of the present invention will be described in detail with reference to FIGS. 6 and 7.

Figure 6:
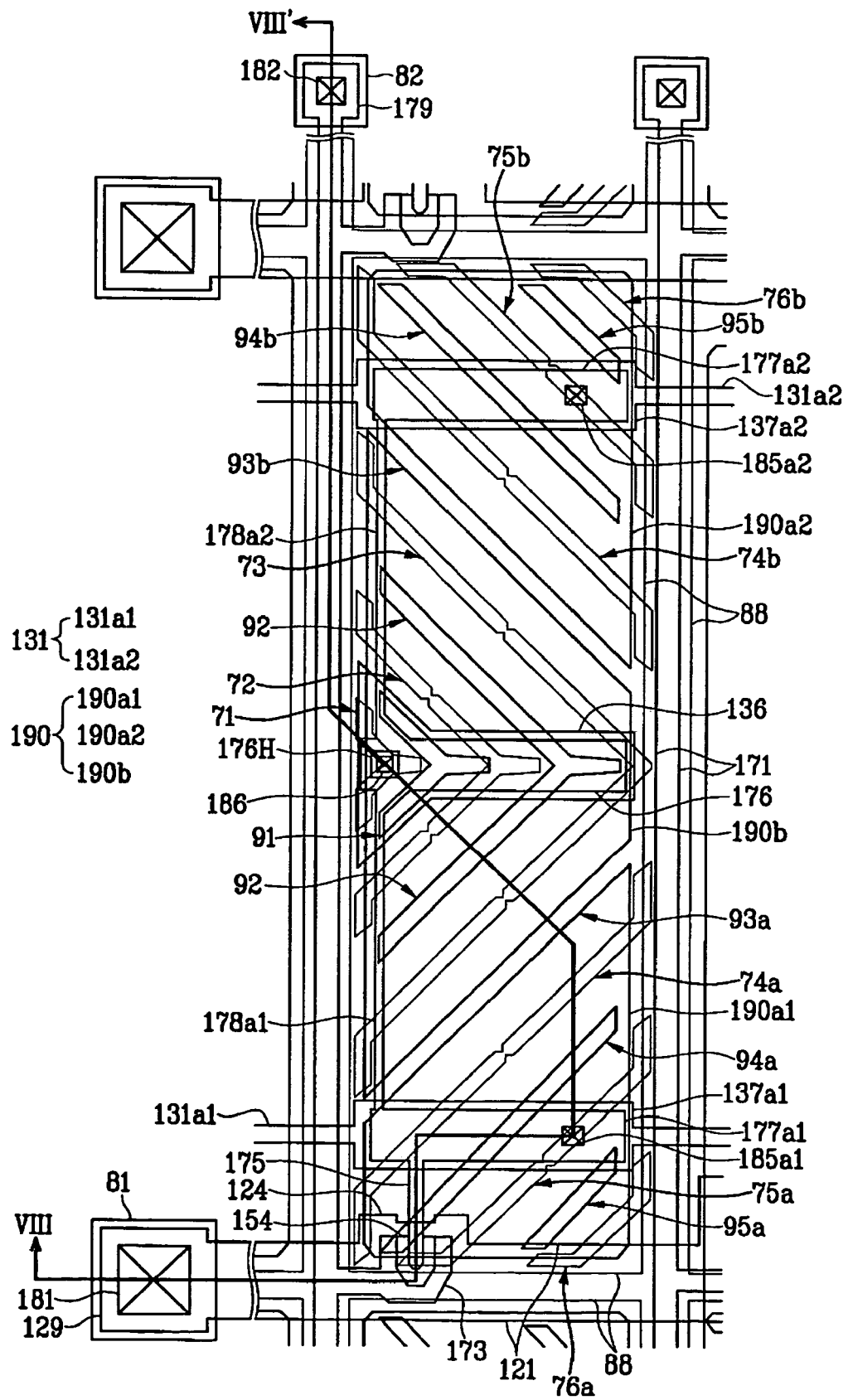
FIG. 6 is a layout view of an LCD according to an exemplary embodiment of the present invention.
Figure 7:
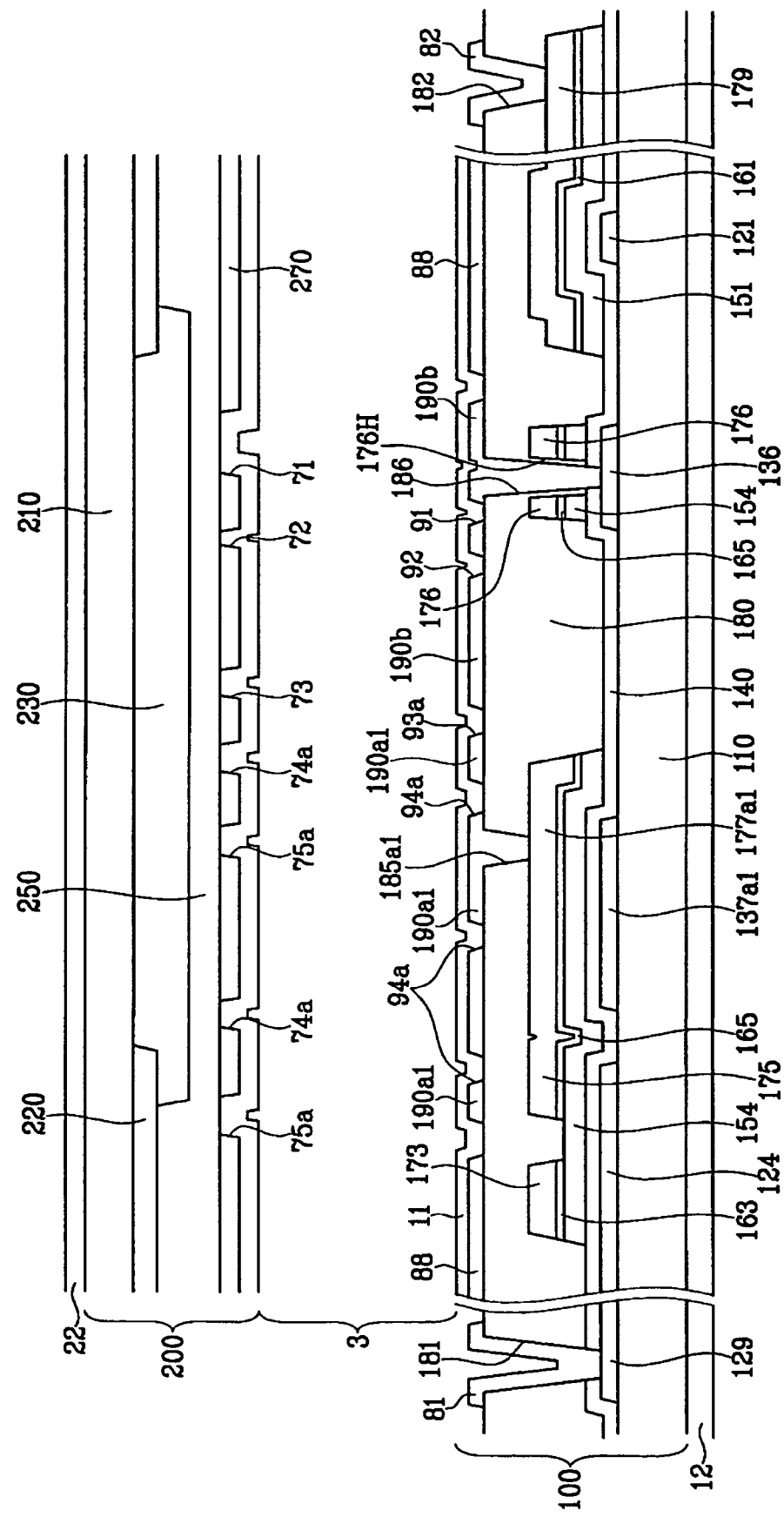
FIG. 7 is a sectional view of the LCD shown in FIG. 6 taken along line VII-VII'.

FIG. 6 is a layout view of an LCD according to another exemplary embodiment of the present invention, and FIG. 7 is a sectional view of the LCD shown in FIG. 6 taken along line VII-VII'.

Referring to FIGS. 6 and 7, the LCD includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this exemplary embodiment are virtually the same as those shown in FIGS. 1-4.

Regarding the TFT array panel 100, a plurality of gate lines 121 including gate electrodes 124 and end portions 129, a plurality of storage electrode lines 131 including stems 131a1 and 131a2 and storage electrodes 137a1 and 137a2, and a plurality of capacitive electrodes 136 are formed on a substrate 110. A gate insulating layer 140, a plurality of semiconductors 154, and a plurality of ohmic contacts 163 and 165 are sequentially formed on the gate lines 121 and the storage electrodes lines 131. A plurality of data lines 171 including source electrodes 173 and end portions 179 and a plurality of drain electrodes 175 including expansions 177a1, 177a2 and 176 and interconnections 178a1 and 178a2 are formed on the ohmic contacts 163 and 165. A passivation layer 180 is formed on the data lines 171, the drain electrodes 175, and exposed portions of the semiconductors 154. A plurality of contact holes 181, 182, 185a1, 185a2 and 186 are provided at the passivation layer 180 and the gate insulating layer 140. The contact holes 186 pass through through-holes 176H provided at the expansions 176 of the drain electrodes 175. Additionally, a plurality of pixel electrodes 190 including subpixel electrodes 190a1, 190a2 and 190b with cutouts 91-95b, a shielding electrode 88, and a plurality of contact assistants 81 and 82 are formed on the passivation layer 180, with an alignment layer 11 being coated thereon.

Regarding the common electrode panel 200, a light blocking member 220, a plurality of color filters 230, an overcoat 250, a common electrode 270 having cutouts 71-76b, and an alignment layer 21 are formed on an insulating substrate 210.

In contrast to the LCD shown in FIGS. 1-4, the semiconductors 154 and the ohmic contacts 163 of the TFT array panel 100 according to this exemplary embodiment extend along the data lines 171 to form semiconductor stripes 151 and ohmic contact stripes 161. In addition, the semiconductor stripes 151 have substantially the same shapes (e.g. planar shapes) as the data lines 171 and the drain electrodes 175, as well as the underlying ohmic contacts 163 and 165. Moreover, the semiconductors 154 include some exposed portions, which are not covered with the data lines 171 and the drain electrodes 175, such as portions located between the source electrodes 173 and the drain electrodes 175.

A manufacturing method of the TFT array panel according to an exemplary embodiment simultaneously forms the data lines 171 and the drain electrodes 175, the semiconductors 151, and the ohmic contacts 161 and 165 using one photolithography step.

A photoresist masking pattern for the photolithography process has position-dependent thickness, and in particular, it has thicker portions and thinner portions. The thicker portions are located on wire areas that will be occupied by the data lines 171 and the drain electrodes 175, and the thinner portions are located on channel areas of TFTs.

The position-dependent thickness of the photoresist may be obtained using several techniques. For example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. For instance, once a photoresist pattern made of a reflowable material is formed using only a normal exposure mask to have transparent areas and opaque areas. The above photoresist pattern is then subjected to a reflow process without use of a photoresist to form certain thin portions of the TFT array panel.

Thus, the above manufacturing process is simpler than conventional processes due to the omission of the photolithography step.

Many of the above-described features of the LCD shown in FIGS. 1-4 may be appropriate to the LCD shown in FIGS. 6 and 7.

An LCD according to another exemplary embodiment of the present invention will be described in detail with reference to FIG. 8.

Figure 8:
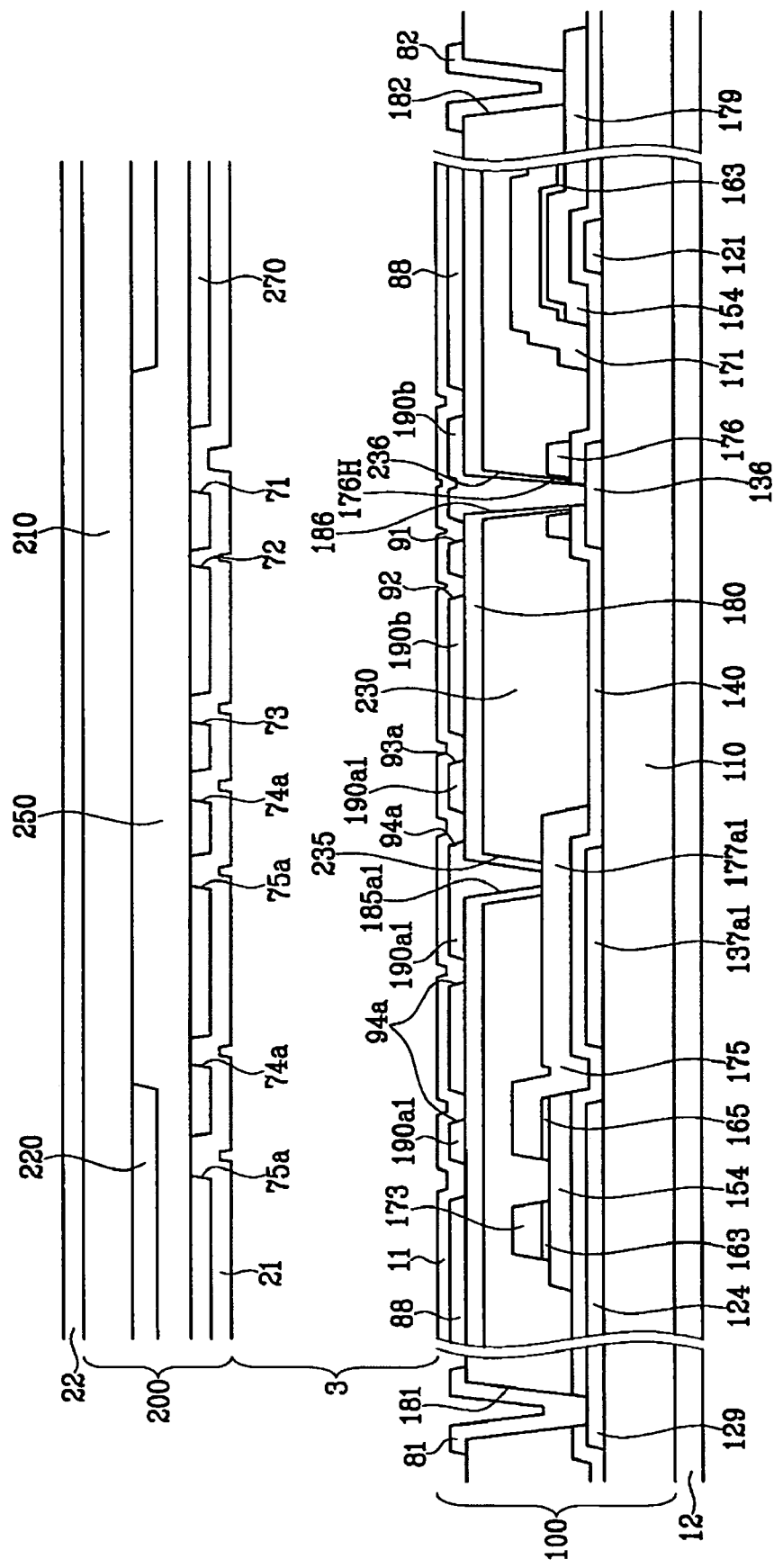
FIG. 8 is a sectional view of the LCD shown in FIG. 3 taken along line IV-IV' according to an exemplary embodiment of the present invention.

FIG. 8 is an sectional view of the LCD shown in FIG. 3 taken along line IV-IV'.

Referring to FIG. 8, the LCD includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this exemplary embodiment are virtually the same as those shown in FIGS. 1-4.

Regarding the TFT array panel 100, a plurality of gate lines 121 including gate electrodes 124 and end portions 129, a plurality of storage electrode lines 131 including stems 131a1 and 131a2 and storage electrodes 137a1 and 137a2, and a plurality of capacitive electrodes 136 are formed on a substrate 110. A gate insulating layer 140, a plurality of semiconductors 154, and a plurality of ohmic contacts 163 and 165 are sequentially formed on the gate lines 121 and the storage electrodes lines 131. A plurality of data lines 171 including source electrodes 173 and end portions 179 and a plurality of drain electrodes 175 including expansions 177a1, 177a2 and 176 and interconnections 178a1 and 178a2 are formed on the ohmic contacts 163 and 165 and the gate insulating layer 140. A passivation layer 180 is formed on the data lines 171, the drain electrodes 175, and exposed portions of the semiconductors 154. A plurality of contact holes 181, 182, 185a1, 185a2 and 186 are provided at the passivation layer 180 and the gate insulating layer 140. The contact holes 186 pass through through-holes 176H provided at the expansions 176 of the drain electrodes 175. Also, a plurality of pixel electrodes 190 including subpixel electrodes 190a1, 190a2 and 190b and having cutouts 91-95b, a shielding electrode 88, and a plurality of contact assistants 81 and 82 are formed on the passivation layer 180 with an alignment layer 11 being coated thereon.

Regarding the common electrode panel 200, a light blocking member 220, an overcoat 250, a common electrode 270 having cutouts 71-76b, and an alignment layer 21 are formed on an insulating substrate 210.

In contrast to the LCD shown in FIGS. 1-4, the TFT array panel 100 includes a plurality of color filters 230 disposed under the passivation layer 180, while the common electrode panel 200 has no color filter. In this case, the overcoat 250 may be removed from the common electrode panel 200.

The color filters 230 are disposed between two adjacent data lines 171 and they have a plurality of through-holes 235 and 236 through which the contact holes 185 and 186 pass through, respectively. The color filters 230 are not provided on peripheral areas of the end portions 129 and 179 of the signal lines 121 and 171.

The color filters 230 may extend along a longitudinal direction to form stripes. The color filters 230 may overlap each other to block light leakage between the pixel electrodes 190, or alternatively may be spaced apart from each other. When the color filters 230 overlap each other, linear portions of the light blocking member 220 may be omitted and in this case, the shielding electrode 88 may cover edges of the color filters 230. Overlapping portions of the color filters 230 may also have a reduced thickness to decrease the height difference between the overlapping portions.

The color filters 230 may be disposed on the passivation layer 180, or the passivation layer 180 may be omitted.

Many of the above-described features of the LCD shown in FIGS. 1-4 are also appropriate for the LCD shown in FIG. 8.

Having described the exemplary embodiments of the present invention, it is further noted that it is readily apparent to those of reasonable skill on the art that various modifications can be made without departing from the spirit and scope of the present invention which is defined by the metes and bounds of the appended claims.

What is claimed is:

1. A thin film transistor array panel for a Liquid Crystal Display apparatus (LCD) comprising:
    a gate line;
    a data line intersecting the gate line;
    a thin film transistor connected to the gate line and the data line and including a drain electrode; and
    a pixel electrode including a first subpixel electrode and a second subpixel electrode connected to the drain electrode of the thin film transistor and a third subpixel electrode capacitively coupled to a coupling electrode extended from the drain electrode,
    wherein the drain electrode comprises a first drain electrode and a second drain electrode,
    wherein the first subpixel electrode is directly connected to the first drain electrode and the second subpixel electrode is directly connected to the second drain electrode, and
    wherein the first subpixel electrode and the second subpixel electrode are disposed opposite to each other with respect to the third subpixel electrode.

2. The thin film array panel of claim 1, wherein the pixel electrode has a partitioning member for partitioning the pixel electrode into at least two partitions, and the at least two partitions having portions which do not overlap the drain electrode and are disposed substantially symmetrical to a reference line equidistant from adjacent gate lines.

3. The thin film array panel of claim 1, wherein the first drain electrode and the second drain electrode are disposed substantially symmetrical to a reference line equidistant from adjacent two gate lines.

4. The thin film array panel of claim 3, further comprising first and second storage electrodes overlapping the first drain electrode and the second drain electrode, respectively.

5. The thin film array panel of claim 4, wherein the first and the second storage electrodes are disposed substantially symmetrical to the reference line.

6. The thin film array panel of claim 3, wherein the first subpixel electrode and the second subpixel electrode are disposed substantially symmetrical to the reference line.

7. The thin film array panel of claim 3, wherein the drain electrode comprises an interconnection connecting the first drain electrode and the second drain electrode.

8. The thin film array panel of claim 7, wherein the interconnection is disposed adjacent to the data line and substantially parallel to the data line.

9. The thin film array panel of claim 3, wherein the coupling electrode overlaps the third subpixel electrode.

10. The thin film array panel of claim 9, further comprising a capacitive electrode connected to the third subpixel electrode and overlapping the coupling electrode.

11. The thin film array panel of claim 10, wherein the coupling electrode or the capacitive electrode is disposed substantially symmetrical to the reference line.

12. The thin film array panel of claim 10, wherein the coupling electrode has a through-hole and wherein the capacitive electrode and the third subpixel electrode are connected to each other through the through-hole.

13. The thin film array panel of claim 1, further comprising a shielding electrode separated from the pixel electrode and overlapping the data line at least in part.

14. The thin film array panel of claim 13, wherein the pixel electrode and the shielding electrode comprise the same layer.

15. The thin film array panel of claim 13, wherein the shielding electrode extends along the data line or the gate line.

16. The thin film array panel of claim 15, wherein the shielding electrode substantially covers the entire data line.

17. The thin film array panel of claim 1, further comprising a shielding electrode separated from the pixel electrode and overlapping the gate line at least in part.

18. A thin film transistor (TFT) array panel for use in a Liquid Crystal Display (LCD) apparatus, comprising:
    a plurality of gate lines having gate electrodes and end portions;
    a plurality of storage electrode lines, a plurality of storage electrodes, and a plurality of capacitive electrodes disposed on a TFT panel substrate;
    a plurality of data lines having source electrodes and end portions and which intersect the plurality of gate lines, a plurality of thin film transistors having a plurality of drain electrodes and said thin film transistors being connected to each of the plurality of gate lines and data lines, said plurality of drain electrodes each having a plurality of expansions and a plurality of interconnections connecting the plurality of expansions together;
    a plurality of pixel electrodes divided into a plurality of sub-pixel electrodes by a plurality of gaps, each of said sub-pixels having a plurality of cutouts, each of said pixel electrodes overlap said gate lines, said cutouts partition each of the sub-pixel electrodes into a plurality of partitions,
    wherein said storage electrode lines, said expansions and said interconnections of the drain electrodes, and said plurality of pixel electrodes having the plurality of gaps are symmetrically arranged with respect to the capacitive electrodes, and
    wherein the capacitive electrodes are formed of a same material and a same layer as the plurality of storage electrodes and wherein the capacitive electrodes are spaced apart from the storage electrodes.

19. The thin film transistor array panel of claim 18, further comprising a plurality of color filters operatively connected to said thin film transistor array panel.

20. The thin film transistor array panel of claim 19, wherein each of the plurality of color filters represent one of the following colors comprising red, green or blue.

21. A thin film transistor array panel for a Liquid Crystal Display apparatus (LCD) comprising:
    a gate line;
    a data line intersecting the gate line;
    a thin film transistor connected to the gate line and the data line and including a drain electrode, the drain electrode comprising a first drain electrode and a second drain electrode;

a pixel electrode including a first subpixel electrode and a second subpixel electrode connected to the drain electrode of the thin film transistor and a third subpixel electrode capacitively coupled to a coupling electrode extended from the drain electrode; and a storage electrode comprising:

a first storage electrode; and a second storage electrode disposed substantially symmetrical to a reference line equidistant from adjacent two gate lines, wherein the first subpixel electrode and the second subpixel electrode are disposed opposite to each other with respect to the third subpixel electrode and, wherein the drain electrode comprises a first drain electrode and a second drain electrode, wherein the first subpixel electrode is directly connected to the first drain electrode and the second subpixel electrode is directly connected to the second drain electrode, and wherein the first drain electrode and the second drain electrode overlap the first storage electrode and the second storage electrode, respectively.

22. The thin film transistor array panel of claim 18, wherein the expansions include an upper expansion, a lower expansion and a central expansion and the central expansions are the coupling electrodes.

* * * * *